March 6, 1962 F. R. WILSON Re. 25,131

TUBE FLARING TOOL WITH CLAMP CARRYING GAUGE MEANS FOR LIMITING THE DEPTH OF TOOL FEED

Original Filed Nov. 19, 1953 2 Sheets-Sheet 1

INVENTOR.
FRANK R. WILSON

BY
DES JARDINS, ROBINSON & KEISER
Howard A. Keiser
HIS ATTORNEYS

March 6, 1962 F. R. WILSON Re. 25,131

TUBE FLARING TOOL WITH CLAMP CARRYING GAUGE MEANS FOR LIMITING THE DEPTH OF TOOL FEED

Original Filed Nov. 19, 1953

2 Sheets-Sheet 2

INVENTOR.
FRANK R. WILSON

BY
DES JARDINS, ROBINSON & KEISER

Howard Keiser
HIS ATTORNEYS

United States Patent Office

Re. 25,131
Reissued Mar. 6, 1962

25,131

TUBE FLARING TOOL WITH CLAMP CARRYING GAUGE MEANS FOR LIMITING THE DEPTH OF TOOL FEED

Frank R. Wilson, Memphis, Tenn., assignor to Quinn Esther Wilson

Original No. 2,853,116, dated Sept. 23, 1958, Ser. No. 393,172, Nov. 19, 1953. Application for reissue Sept. 23, 1960, Ser. No. 58,149
28 Claims. (Cl. 153—81)

Matter enclosed in heavy brackets [ ] appears in the original patent but forms no part of this reissue specification; matter printed in italics indicates the additions made by reissue.

This invention relates to tube flaring tools and, more particularly, to gauges for such tools for insuring that the flares produced thereby will be properly dimensioned and will conform with standards prescribed therefor. The invention also relates to a novel form of flaring cone for use with tube flaring tools.

In the past, gauges of various sorts have been proposed for use with tube flaring tools to facilitate the formation of flares of the proper depth and the different sizes of tubing being flared. However, none of the gauges proposed for use with flaring tools capable of flaring the tubing in the air have been of a type which would definitely and positively limit the entrance of the flaring cone into the tube to a prescribed amount. Nor have any of these gauges been automatically adjustable in accordance with the size of the tubing being flared.

Accordingly, it is an object of my invention to provide an automatic flare gauge for controlling the depth of the flare produced by a tube flaring tool.

Another object of the invention is to provide a flare gauge in which the depth of flare is automatically controlled in accordance with the adjustment of the tube clamping means.

Another object of the invention is to provide a flare gauge having a series of graduated abutment faces which are indexed into operating position upon movement of the clamping means to bring the proper size recess into position beneath the flaring cone.

Another object of the invention is to provide a novel design of flaring cone which is suited for use with my novel type of flare gauge.

With these and other objects in view which will become apparent from the following description, the invention includes certain novel features of construction and combinations of parts the essential elements of which are set forth in the appended claims and several preferred forms or embodiments of which will hereinafter be described with reference to the drawings which accompany and form a part of this specification.

In the present drawings I have shown my novel, positive-acting flare gauge embodied in two different forms to better illustrate the fundamental, underlying principles of the invention. In both cases, the gauge is shown in connection with flaring tools adapted to flare tubes in the air, my gauge being particularly suited to this type of tube flaring operation and finding its greatest utility in this sort of environment. There is also shown herein a novel design of flaring cone which is of simple construction but which is efficient in operation and ideally suited for use in conjunction with my novel flare gauge since it is capable of producing accurate flares on tubes flared in the air.

Figure 1:
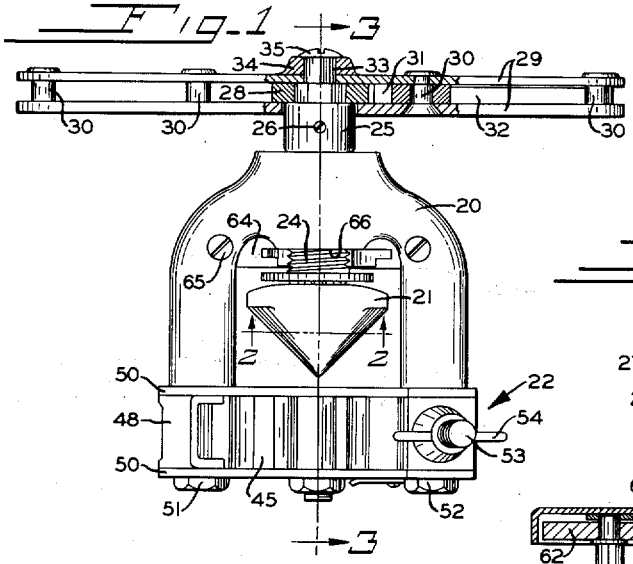
FIG. 1 is a side elevation of a tube flaring tool incorporating one form of my novel flare gauge and also my new design of flaring cone which is capable of flaring tubes in the air.
Figure 2:
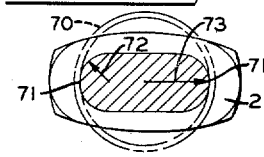
FIG. 2 is a cross-sectional vew taken along the line 2—2 in FIG. 1 for the purpose of showing the shape of the cone as viewed in a lateral section therethrough.
Figure 3:
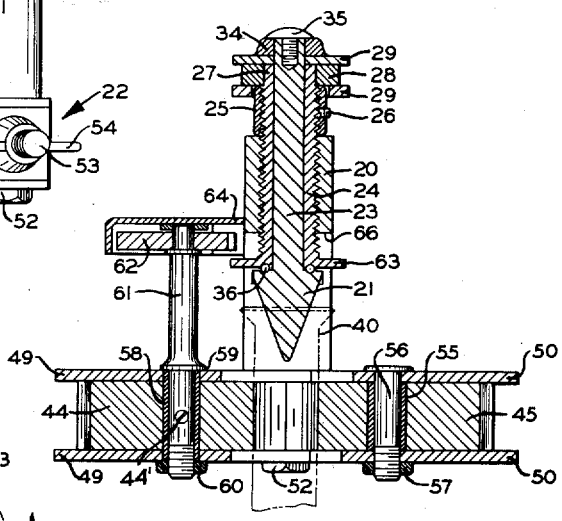
FIG. 3 is a cross-sectional view taken along the line 3—3 in FIG. 1.

One form or embodiment of my invention is shown in FIGS. 1 to 7, inclusive, wherein there is shown a flaring tool having a yoke 20 on which a flaring cone 21 and a tube clamping means 22 are mounted. As shown in FIG. 3, the cone 21 is either integral with or firmly secured to a spindle 23 which is rotatably journaled in a threaded sleeve 24 which is received within a threaded aperture provided in the cross bar of the yoke 20. An abutment shoulder in the form of collar 25 is screwed onto the upper end of the sleeve 24 and secured in place thereon by a recessed-head setscrew 26. As shown in FIG. 3, the extreme upper end of the sleeve 24 is provided with a hexagonal seat 27 for receiving a ratchet 28 provided with a hexagonal hole or socket which slips over the seat 27. The ratchet 28 is loosely held between a pair of plates 29 which are maintained in spaced relation by rivets 30. Mounted on one of the rivets 30 is a double-acting pawl 31 which is urged by a toggle spring 32 in one direction or another to maintain one or the other of the two teeth provided thereon in engagement with the ratchet 28. The details of this pawl and ratchet mechanism are clearly shown in my Patent No. 2,711,576 which issued June 28, 1955, for Tube Clamping Means from my copending application Serial No. 274,403, filed March 1, 1952, and to which reference is made for a complete disclosure of this mechanism. The plates 29 provide a rotating handle for the flaring cone 21, the handle being keyed to the spindle 23 by a square tenon 33 on the upper end thereof which is received in a square aperture provided in a cap 34 welded on the upper plate 29 of the handle. The entire assembly is held together by a cap screw 35 which screws into the upper end of the spindle. A ball type thrust bearing 36 is provided between the top of the cone 21 and the bottom of the sleeve 24 for taking up the upward thrust on the cone and permittting free rotation of the cone relative to the sleeve.

By means of this construction, it is possible to selectively connect or disconnect the threaded sleeve 24 from the spindle 23 so that the cone 21 may be rotated with or without feeding movement toward or away from the end of a tube 40 (FIG. 3) held in the clamping means 22. This construction permits the interior face of the flare to be burnished after it has been formed thereon by disconnecting the sleeve from the spindle by suitable manipulation of the pawl 31 so that the cone may be rotated dithout advancement.

Figure 4:
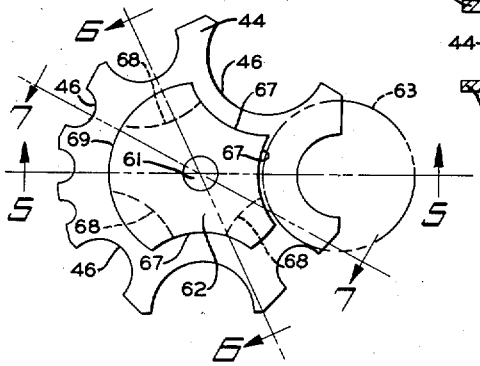
FIG. 4 is a diagrammatic view showing the gauging member in relation to the clamping die with which it is associated.
Figure 5:
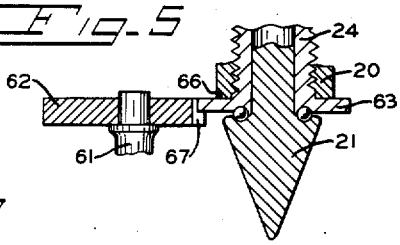
FIG. 5 is a cross-sectional view taken along the line 5—5 in FIG. 4 illustrating the operation of the gauging device.

The clamping means 22 for receiving and holding the tube 40 to be flared, includes a pair of clamping dies 44 and 45 having semi-circular clamping recesses, as shown in FIG. 4, and mounted for rotation about their centers to permit the various sized clamping recesses to be brought into alignment with the longitudinal axis of the flaring cone. This clamping means, including the die blocks 44 and 45 is fully shown and described in my copending application Serial No. 274,403, to which reference may be had for a more complete understanding of this part of the flaring tool. As best shown in FIG. 4 each of the die blocks 44 and 45 is in the form of a recessed irregular polygon in cross section, the length of each face of said polygon being proportional to the size of the clamping recess formed therein. The die blocks 44 and 45 are each provided with nine semicylindrical recesses 46 whose centers all lie on a common circle whose center coincides with the axis of rotation of the die block.

The pair of die blocks are freely rotatable between two sets of spaced base plates 49 and 50, respectively, the base plates 49 being immovably secured to the legs of the yoke by bolts 51 and 52 (FIG. 1). The base plates 50 are secured to a U-shaped bracket 48 which is supported on the bolt 51 for pivotal movement thereabout so as to enable the plates 50 and the die block 45 to be swung away from the plates 49 and the die block 44 to permit insertion and removal of tubes from the clamping means. A clamping bolt 53 is supported for pivotal movement about the bolt 52 so that the clamping bolt and its wing nut 54 screwed thereon may be swung into clamping position as shown in FIG. 1 after which the wing nut 54 may be tightened to securely clamp the base plates and die block together.

The die block 45 is freely rotatable about a sleeve 55 which encompasses a threaded stud 56 on which is screwed a nut 57 which may be tightened to securely clamp the sleeve 55 between the nut and the head of the stud 56.

The die block 44, on the other hand, is fast on a sleeve 58 which is clamped between a shoulder 59 and a nut 60 provided on the lower end of a gauging spindle 61. The block 44, sleeve 58 and spindle 61 are fastened together by a pin 44' which passes therethrough and causes them to rotate as a unit. The sleeve 58 is freely rotatable in apertures provided in the base plates 49 so that the die block 44 and the spindle 61 may rotate as a unit to bring the various recesses 46 into alignment with the longitudinal axis of the flaring cone. Fast on the upper end of the spindle 61 is a dis-like gauging member 62 which cooperates with an abutment in the form of annular shoulder 63 formed on the lower end of the sleeve 24 for the purpose of determining the depth of the flare to be formed on the tube 40. At its extreme upper end, the spindle 61 is journaled in a bearing provided therefor in a housing 64 which is mounted on the yoke 20 by screws 65 (FIG. 1), the housing serving to enclose and protect the gauging member 62.

Figure 6:
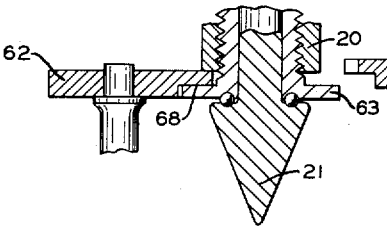
FIG. 6 is a cross-sectional view taken along the line 6—6 in FIG. 4 showing the gauging device in a different position.

The manner in which the member 62 cooperates with the flange 63 is best shown in FIGS. 4 to 7, inclusive, As shown in FIG. 3, the lower limit of movement of the cone 21 is fixed and is determined by engagement of the bottom edge of the collar 25 with the top of the yoke 20 to limit downward feeding movement of the cone into the tube. The upper limit of movement of the cone is variable and is limited by engagement of the annular flange 63 either with one of the gauging surfaces provided on the gauge member 62 or with the bottom surface 66 of the yoke 20. For the larger sizes of tubing, the disc 62 is cut out to permit free passage of the flange 63 up against the surface 66 on the yoke. There are three such cutouts, these being indicated by reference numeral 67 in FIG. 4. It will be seen from this figure that each of the cutout portions 67 is aligned with one of the three largest clamping recesses 46. Consequently, when any one of these three recesses is brought into alignment with the longitudinal axis of the flaring cone one of the cutout portions 67 on the gauging member 62 will likewise be moved into alignment with the longitudinal axis of the cone and the sleeve 24 so that the flange 63 will be unobstructed in its upward travel until it abuts against the surface 66 on the yoke. Hence, the cone 21 is free to travel up and down through the full distance permitted by the flange 63 and the collar 25. To reduce the depth of flare when working with tubes of medium size, the gauge member 62 is provided with recesses 68 which extend approximately half way through the thickness of the member 62 as best shown in FIG. 6. As shown in FIG. 4 there are three such recesses 68, one for each of the three medium size recesses 46 in the die block 44. The recesses 68 and the three medium size clamping recesses 46 are in alignment so that when a tube of medium size is clamped between the die blocks, a recess 68 will lie in position to engage the flange 63 and limit the upward travel of the cone in the manner indicated in FIG. 6. Hence, the vertical travel of the flaring cone will be reduced and the depth of the flare provided on the tube will likewise be reduced.

Figure 7:
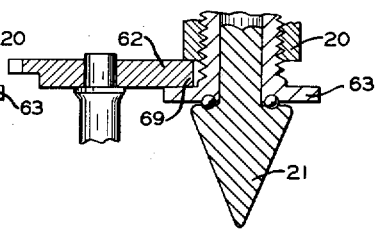
FIG. 7 is a fragmentary cross-sectional view taken along the line 7—7 in FIG. 4 showing the gauging device in still another position.

To provide the least depth of flare on tubes of small diameter, the gauge member 62 is provided with a portion 69 of full thickness which lies in alignment with the three smallest clamping recesses 46. As shown in FIG. 7, when any one of these recesses is moved into axial alignment with the axis of the flaring cone, the portion 69 will be brought into position above the flange 63 thereby reducing the upper travel of the flaring cone to a minimum.

The operation of the form of gauging device shown in FIGS. 1 to 7, inclusive, is as follows:

To produce an accurately dimensioned flare on a piece of tube of any given size, the clamping means 22 of the tube flaring tool (FIG. 1) is opened and the die blocks 44 and 45 are then turned to bring the clamping recesses 46 on the die blocks corresponding in size to the size of tube to be flared into alignment with the axis of the flaring cone. The handle 29 of the tool is then turned counterclockwise so as to elevate the flaring cone 21 to its starting position. This position will be determined by the position of the gauge member 62. For the larger sizes of tubing, the conditions shown in FIG. 6 will prevail wherein the cut-out portions 67 will permit the flange 63 to move all the way up into engagement with the surface 66 on the bottom of the yoke 20. In the case of tubes of intermediate size, the flange 63 will engage with the face of the recess 68 as shown in FIG. 6, while for the smaller sizes of tubing the flange will engage with the bottom face of the member 62 as shown in FIG. 7. The tube to be flared is now inserted into the die opening and pushed all the way up until it is stopped by the flaring cone 21. The die blocks are then securely clamped together by tightening the wing nut 54 (FIG. 1) so as to securely hold the tube in place beneath the flaring cone. The pawl 31 is now flipped to driving position and the handle 29 is turned clockwise to feed the flaring cone downwardly into the end of the tube 40. As soon as the bottom of the collar 25 contacts the top of the yoke 20 further turning movement of the sleeve 24 will be prevented and the operator of the tool will be unable to continue to rotate the handle 29. The pawl 31 is then flipped to burnishing position whereupon the handle may be rotated to turn the cone 21 independently of the sleeve 24 so as to burnish the inside face of the flare. After the burnishing operation, the flaring of the tube 40 will be complete and the clamping means may be opened so as to permit removal of the tube from the tool. The tool is now ready to receive the next piece of tubing to be flared, the die blocks 44 and 45 being adjusted to suit the size of the new piece of tubing. The indexing of the die block 44 will cause corresponding indexing of the gauging member 62 so as to properly limit the upward travel of the threaded sleeve 24 in accordance with the diameter of the tube to be flared. Hence, it will be seen that a positive type gauge is hereby provided for limiting the depth of flare to the extent required for the formation of a properly dimensioned tube flare.

As shown in FIG. 2, the flaring cone is flattened so as to restrict the contact thereof with the tube 70 to be flared to the opposite sides 71 of the cone. In fact, since tube contacting edges of the cone are rounded on a radius 72 which is smaller than the radius 73 of the cone at this point, only line contact will exist between the sides of the cone and the wall of the tube.

The cone 21 is preferably coated with a hard, corrosion resistant metal such as chromium which is given a high polish to reduce the friction between the cone and the tube and to prevent any pick-up of metal by the cone from the tube.

It will be found that my novel form of flaring cone 21 will provide a highly polished, accurately formed flare on the end of the tube. Furthermore, the amount of effort required to turn the handle 29 will be found to be considerably less than with conventional types of flaring cones. This is because essentially line contact exists between the flaring cone and the wall of the tube and the amount of friction is therefore greatly reduced. The hard and highly polished surface of the cone helps to cut down the friction between the cone and the tube and prevents any roughening of the wall of the flare due to pick-up of metal particles by the cone.

Figure 8:
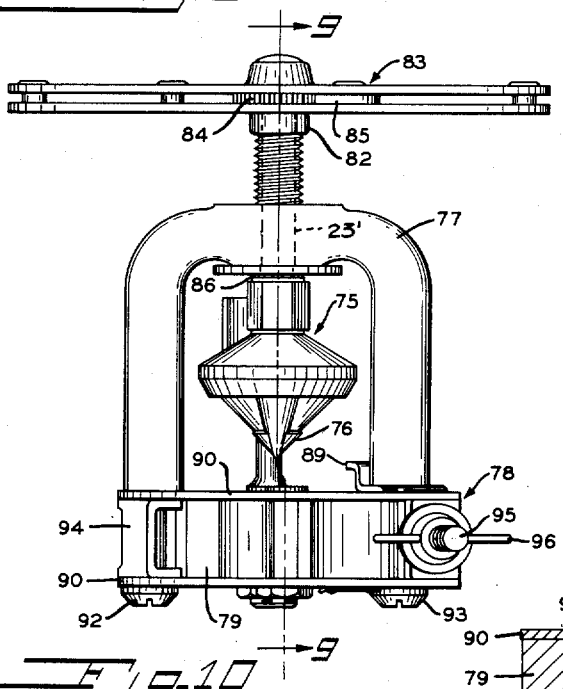
FIG. 8 is a side elevation of a tube flaring tool showing a second form or embodiment of my automatic flare gauge.

A modified form of my invention is shown in FIGS. 8 to 13, inclusive, wherein there is shown a flaring tool similar to the one heretofore described except for the flaring cone which, as shown in FIG. 8, comprises a cone 75 fitted with conical rollers 76 which operate to roll the flare on the end of the tube. This type of flaring cone is fully shown and described in my said Patent No. 2,711,576 mentioned above. For further information regarding the flaring cone, reference may be made to this application. Like the tool shown in FIGS. 1 and 3, the flaring tool shown in FIGS. 8 and 9 has a yoke 77 to which is fastened a clamping means 78 consisting of a pair of complementary die blocks 79 and 80. The yoke is provided with a threaded aperture for receiving a threaded sleeve 81 which carries an abutment collar 82. The flaring cone 75 is secured to a spindle (not shown) which is journaled within the sleeve 81 and is keyed to the operating handle 83. The upper end of the sleeve 81 is keyed to a ratchet 84 which is adapted to be driven by a double acting pawl 85 carried by the handle 83. A ball type anti-friction bearing 86 is interposed between the bottom of the sleeve 81 and the top of the flaring cone 75 so as to take up the upward thrust on the cone and permit free rotation of the cone relative to the sleeve.

The clamping means 78 is similar to the one shown in my aforementioned Patent No. 2,711,576 and includes two pairs of base plates 90 and 91 between which the die blocks 79 and 80 are located. The base plates 91 are secured to the legs of the yokes 77 by bolts 92 and 93 while the base plates 90 are arranged for pivoting movement about the bolt 92 by means of a U-shaped bracket 94 secured to the plates 90 and apertured to receive the shank of the bolt 92. A clamping bolt 95 carrying a wing nut 96 is provided for clamping the die blocks securely together after the tube to be flared has been inserted therebetween.

The die block 79 is mounted for free rotation about a sleeve 98 which is clamped between the base plates 90 by a headed stud 97 which passes through the sleeve and base plates and is threaded to receive a nut 87. The sleeve 98 serves as a spacer to hold the base plates apart so that the block 79 can rotate freely between them.

The die block 80 is mounted on a sleeve 100 which receives the lower end of a spindle 99. The block, sleeve and spindle are fastened together by a pin 88 which passes therethrough and causes them to rotate as a unit. The spindle is provided with a shoulder 101, against which the upper end of the sleeve abuts, and is threaded at its lower end to receive a nut 102 which clamps against the lower end of the sleeve. The sleeve is of sufficient length to permit free turning movement of the block between the base plates 91. As the die block 80 is turned about its axis between the base plates 91, the spindle 99 will turn therewith and cause a gauging member 103 mounted on the upper end thereof to be indexed to different positions beneath an annular flange 104 provided on the lower end of the sleeve 81.

In this modification of my device it is desirable to provide means for limiting the insertion of the tubing in the clamping device to a predetermined, constant extent for all sizes of tubing. Accordingly, I have provided, in this case, a blade 89 which is pivoted on the bolt 93 and constrained to swing with the clamping bolt 95 in the manner described in connection with the gauging blade described in my copending patent application Serial No. 384,302 filed October 5, 1953, and entitled Flare Gauge. Hence, when the bolt 95 is swung to its open position, the blade 89 will lie over the clamping recess and limit the insertion of the tubing to a predetermined extent. When the bolt 95 is swung to its closed position, the blade will be moved away from over the recess to the position shown in FIGS. 8 and 9 where it will not interfere with the flaring operation.

Figure 10:
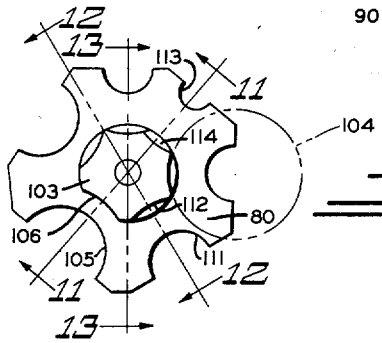
FIG. 10 is a diagrammatic view showing the relationship between the gauge member and the clamping die with which it is associated.
Figure 11:
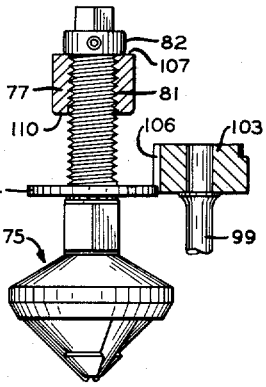
FIG. 11 is a cross-sectional view illustrating the gauging member in the position which it occupies when flaring large diameter tubes, this view being taken along the line 11—11 in FIG. 10.

As best shown in FIG. 10, the gauging member 103 is provided with a series of graduated abutment faces which cooperate with the flange 104 to limit the downward movement of the flaring cone 75. These abutment faces are aligned with their respective clamping recesses provided in the die block 80 so that as the clamping recesses are brought into alignment with the longitudinal axis of the flaring cone, the abutment faces on the gauging member 103 will likewise be brought beneath the flange 104. As shown in FIGS. 10 and 11, the member 103 is provided with a cut-out portion 106 which lies in alignment with the largest clamping recess 105 on the die block 80. Consequently, when this recess is brought into axial alignment with the flaring cone, the cut-out 106 associated therewith will lie beneath the flange 104 so as to permit uninterrupted downward travel of the sleeve 81 as the handle 83 is turned clockwise. Hence, the flaring cone may be fed down into the tube until the abutment collar 82 contacts the upper face 107 of the yoke 77 to stop further feeding movement of the cone. This condition is illustrated in FIG. 11 where the abutment collar is shown engaged with the face 107 on the yoke 77 to limit downward movement of the cone. When tubes of intermediate size are to be flared, a clamping recess of intermediate size such as the recess 111, will be utilized for receiving and clamping the tube to be flared. As shown in FIG. 10, the recess 111 has aligned therewith a recessed abutment face 112 which is adapted to engage with the underface of the flange 104 and limit the downward travel of the flaring cone to the extent shown in FIG. 12.

When tubing of small size is to be flared, a small size clamping recess, such as the recess 113, is swung into alignment with the flaring cone thereby bringing a portion 114 on the member 103 into alignment with the flange 104. As a result, downward feeding movement of the flaring cone is limited by engagement of the under face of the flange with the top face of the member 103 in the manner indicated in FIG. 13.

In each case, upward travel of the cone is limited to the extent permitted by engagement of the top face of the flange 104 with the bottom surface 110 on the yoke 77.

Figure 9:
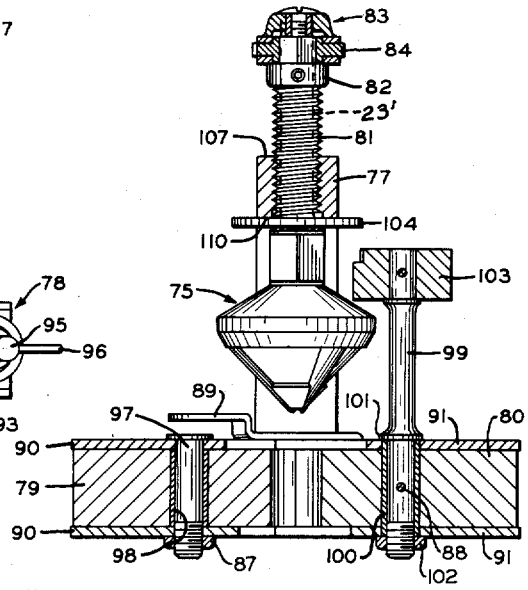
FIG. 9 is a cross-sectional view taken along the line 9—9 in FIG. 8.
Figure 12:
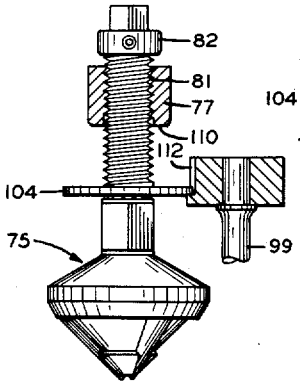
FIG. 12 is a fragmentary cross-sectional view showing the position which the gauging member occupies when flaring tubes of medium size, this view being taken along the line 12—12 in FIG. 10.
Figure 13:
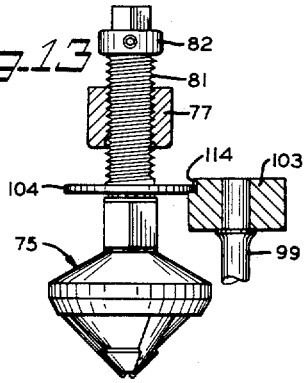
FIG. 13 is a fragmentary cross-sectional view showing the position of the gauging member when flaring small diameter tubes, this view being taken along the line 13—13 in FIG. 10.

The operation of the gauging device shown in FIGS. 8 to 13, inclusive, is as follows:

The normal starting position of the flaring cone in the modification shown in FIGS. 8 to 13, inclusive, is the fully elevated position thereon shown in FIGS. 8 and 9. When the user of the tool wishes to provide a flare of the proper shape and size on the end of a piece of tubing of given size, he notes the outside diameter of the tube and selects the corresponding clamping recesses on the die blocks 79 and 80, the die blocks being rotated about their axes to bring these recesses into alignment with the longitudinal axis of the flaring cone. With the cone in its fully raised position, the tubing is inserted in the die opening from the bottom and pushed upwardly until it engages with the blade 89. The clamping bolt 95 is then swung closed and the thumb screw 96 tightened to securely clamp the tube in place beneath the cone. The handle 83 is then turned clockwise so as to feed the flaring cone down into the tube and produce a flare on the end of the tube. The downward travel of the cone will be limited either by the engagement of flange 104 with the gauging member 103, or by abutment of the collar 82 against the abutment face 107 on the yoke 77. If the largest size of tubing is to be flared, the cut-out portion 106 on the member 103 will be positioned beneath the flange 104 so that full downward travel of the cone will be permitted and downward feeding movement of the cone will continue until stopped by abutment collar 82. If the tubing is of intermediate size, an abutment face such as the face 112 will be brought beneath the flange 104 and downward feeding movement of the cone will be limited as indicated in FIG. 12. If the smallest diameter of tubing is to be flared, the abutment face 114 will be brought into alignment with the flange so as to stop the downward movement of the cone after a relatively small amount of travel as shown in FIG. 13.

After the advancement of the cone into the tube has been stopped, in the above-described manner, the pawl 85 may be flipped to permit rotation of the cone without further advancement of the threaded sleeve 81 so that burnishing of the flare may be effected. After burnishing, the handle 83 may be rotated counterclockwise to remove the cone from the tube and raise the cone to its fully elevated position as shown in FIGS. 8 and 9. The clamping means 78 is then opened and the flared piece of tubing removed from the tool. The tool is then ready to receive the next piece of tubing to be flared and the die blocks 79 and 80 are then turned to bring clamping recesses of the proper size into alignment with the flaring cone after which the new piece of tubing is inserted in the clamping means until it is stopped by the blade 89. As before, the clamping means may then be shut and clamped and the handle 83 rotated clockwise to feed the cone into the tube as far as the automatic gauging means will permit.

It will be observed from the foregoing description of my invention that no conscious attention is required on the part of the user of the tool in order to provide a flare of proper depth. This is all automatically taken care of by my novel gauging device when the clamping means is adjusted for the size of tube to be flared. Since a positive stop is provided for limiting the travel of the cone into the tube, it is impossible for the user of the tool to inadvertently run the cone too far into the tube and thereby produce an incorrectly dimensioned flare.

While I have described my invention in connection with certain, definite physical embodiments and have used, therefore, certain specific terms and language in describing the structures shown, it is to be understood that the present disclosure is illustrative rather than restrictive and that changes and modifications may be made therein without departing from the spirit or scope of the claims which follow.

Having thus described my invention, what I claim as new and useful and desired to secure by United States Letters Patent, is:

1. An automatic gauge for a tube flaring tool comprising a yoke, a flaring cone mounted for rotation on said yoke, a pair of tube clamping dies supported on said yoke, said dies each having a plurality of clamping recesses of different sizes formed therein and each being adjustable relative to said yoke to enable recesses of different sizes to be brought into axial alignment with said cone, means for feeding said cone axially of the tube to be flared, and a gauging device settable in accordance with the adjustment of said dies for limiting the feeding movement of said cone to an extent commensurate with the size of the recesses brought into alignment with the cone.

2. The automatic gauge of claim 1 wherein said clamping dies are each irregularly polygonal in cross-section and are mounted for rotation on said yoke to enable recesses of different sizes to be brought into axial alignment with said flaring cone, and said gauging device is rotatable in accordance with the rotation of said dies.

3. The automatic gauge of claim 1 wherein said gauging device is secured to and movable with one of said clamping dies.

4. The automatic gauge of claim 1 wherein said feeding means includes a threaded sleeve, and a flange on said sleeve cooperating with said gauging device for limiting the feeding movement of said cone.

5. A flare gauge for a tube flaring tool comprising a rotatable flaring cone, a mounting for the flaring cone, a clamping means on said mounting having recesses for receiving and holding various sizes of tubes, said means being rotatably attached to said mounting to bring a selected recess into axial alignment with said flaring cone, means for feeding said cone along its axis of rotation as it is rotated, and a gauging device moving with said clamping means into position for limting the feeding movement of said cone to an extent corresponding to the size of the recess selected for use.

6. The flare gauge of claim 5 including an abutment shoulder moving with said cone as it is fed along its axis of rotation, and a plurality of abutment surfaces on said gauging device arranged for coaction with said abutment shoulder.

7. An automatic flare gauge for tube flaring tools comprising a yoke, a threaded sleeve received within a threaded hole provided in said yoke, a flaring cone having a spindle rotatably journaled within said sleeve, a handle for turning said spindle, means for selectively connecting said spindle and said sleeve for conjoint rotation to control feeding or non-feeding movement of said cone as said handle is rotated, a pair of tube clamping dies supported on said yoke, each die being provided with a plurality of clamping recesses of different sizes and mounted to rotate about an axis substantially parallel to the axis of said spindle to enable a selected recess to be brought into axial alignment with said cone, and a gauging member fastened to one of said dies and adapted to cooperate with said sleeve to limit axial feeding movement of said sleeve to an extent corresponding to the size of the recess located in alignment with said cone.

8. The flare gauge of claim 7 wherein said one die is provided with an axle on which said gauging member is mounted.

9. The flare gauge of claim 7 including a flange on said sleeve, and cooperating abutment faces on said gauging member.

10. The flare guage of claim 7 including a plurality of abutment faces on said gauging members and a pair of abutments on said sleeve, one of said abutments cooperating with said yoke to limit axial feeding movement of the sleeve in one direction, and the other of said abutments cooperating with one of the faces on said gauging member to variably limit axial feeding movement of the sleeve in the opposite direction.

11. The flare gauge of claim 7 including a plurality of abutment faces on said gauging member, an abutment on said sleeve cooperating with said yoke for limiting inward feeding movement of said sleeve, and a second abutment on said sleeve cooperating with one of the faces on said gauging member for variably limiting outward feeding movement of said sleeve.

12. The flare gauge of claim 7 including a plurality of abutment faces on said gauging member, an abutment on said sleeve cooperating with said yoke for limiting outward feeding movement of said sleeve, and a second abutment on said sleeve cooperating with one of the faces on said gauging member for variably limiting inward feeding movement of said sleeve.

13. The flare gauge of claim 7 including a fixed stop on said sleeve cooperating with said yoke for limiting inward feeding movement of said sleeve, a plurality of abutment faces on said gauging member, and an annular flange on said sleeve cooperating with one of said faces for variably limiting outward feeding movement of said sleeve.

14. The flare gauge of claim 7 including a plurality of abutment faces on said gauging member, an annular flange on said sleeve, a surface on said flange cooperating with said yoke for limiting outward feeding movement of said sleeve, and another surface on said flange cooperating with one of the faces of said gauging member for variably limiting inward feeding movement of said sleeve.

15. The flare gauge of claim 7 including means on the outer end of said sleeve for cooperating with said yoke to determine the inward limit of movement of said sleeve, an annular flange on the inner end of said sleeve, a surface on said flange cooperating with said yoke to determine the outward limit of movement of said sleeve, a plurality of graduated faces on said gauging member, and a second surface on said flange cooperating with one of said abutment faces to establish limits of movement of said sleeve intermediate said inner and outer limits.

*16. A gauge for a tube flaring tool comprising a yoke, a flaring cone mounted on said yoke, tube clamping dies supported on said yoke, said dies having a plurality of clamping recesses of different sizes, each die being adjustable relative to said yoke to enable recesses of different sizes to be brought into axial alinement with said cone, means for feeding said cone axially of the tube to be flared, and a gauging device settable in accordance with the adjustment of said dies for limiting the feeding movement of said cone to an extent commensurate with the size of a recess brought into alinement with the cone, said feeding means having abutments on each end for cooperating with said gauging device and said yoke.*

*17. The gauge of claim 16 wherein said clamping dies are each polygonal in cross section and are mounted for rotation on said yoke to enable recesses of different sizes to be brought into axial alinement with said flaring cone, and said gauging device is rotatable in accordance with the rotation of said dies.*

*18. The gauge of claim 16 wherein said gauging device is secured to and movable with one of said clamping dies.*

*19. The gauge of claim 16 wherein said feeding means includes a threaded sleeve, and a flange on said sleeve cooperating with said gauging device for limiting the outward feeding movement of said cone.*

*20. A flare gauge for tube flaring tools comprising a yoke, a flaring cone having a spindle rotatably supported by said yoke, means for feeding said cone under rotation relatively to said yoke, a handle for turning said spindle to control feeding movement of said cone as said handle is rotated, a pair of tube clamping dies supported on said yoke, each die being provided with a plurality of clamping recesses of different sizes and mounted to rotate about an axis substantially parallel to the axis of said spindle to enable a selected recess to be brought into axial alinement with said cone, and a gauging member fastened to one of said dies and adapted to cooperate with means on said spindle to limit axial feeeding movement of said spindle to an extent commensurate with the size of the recess located in alinement with said cone.*

*21. The flare gauge of claim 20 wherein said one die is provided with an axle on which said gauging member is mounted.*

*22. The flare gauge of claim 20 in which said means on said spindle comprises a flange carried by said spindle, and said gauging member includes abutment faces respectively cooperating with said flange for accomplishing said axial feeding limit.*

*23. The flare gauge of claim 20 in which said gauging member includes a plurality of abutment faces on said gauging member, and a pair of abutments carried by said spindle, one of said abutments cooperating with said yoke to effect said limit of axial feeding movement of the spindle in one direction, and the other of said abutments cooperating with one of the faces of said gauging member to effect said limit of axial feeding movement of the spindle in the opposite direction.*

*24. The flare gauge of claim 20 in which said gauging member includes a plurality of abutment faces on said gauging member, an abutment carried by said spindle cooperating with said yoke for limiting inward feeding movement of said spindle, and a second abutment carried by said spindle cooperating with one of the faces on said gauging member for limiting outward feeding movement of said spindle.*

*25. The flare gauge of claim 20 in which said gauging member includes a plurality of abutment faces on said gauging member, and said means on said spindle comprises an abutment carried by said spindle cooperating with said yoke for limiting outward feeding movement of said spindle and a second abutment carried by said spindle cooperating with one of the faces on said gauging member for limiting inward feeding movement of said spindle.*

*26. The flare gauge of claim 20 in which said means on said spindle includes a fixed stop connected to said spindle cooperating with said yoke for limited inward feeding movement of said spindle, said gauging member includes a plurality of abutment faces on said gauging member, and said means on said spindle further includes an annular flange connected to said spindle cooperating with one of said faces for limiting outward feeding movement of said spindle.*

*27. The flare gauge of claim 20 in which said gauging member includes a plurality of abutment faces on said gauging member, and said means on said spindle comprises an annular flange connected to said spindle, a surface on said flange cooperating with said yoke for limiting outward feeding movement of said spindle, and another surface on said flange cooperating with one of the faces of said gauging member for limiting inward feeding movement of said spindle.*

*28. The flare gauge of claim 20 in which said means on said spindle includes means mounted adjacent the*

*outer end of said spindle for cooperating with said yoke to determine the inward limit of movement of said spindle, said means on said spindle further includes an annular flange adjacent the inner end of said spindle, a surface on said flange cooperating with said yoke to determine the outward limit of movement of said spindle, a plurality of graduated faces on said gauging member, and a second surface on said flange cooperating with one of said abutment faces to establish limits of movement of said spindle intermediate said inner and outer limits.*

References Cited in the file of this patent
or the original patent

UNITED STATES PATENTS

| | | |
|---|---|---|
| 1,081,932 | Smith | Dec. 16, 1913 |
| 1,231,946 | Schellenbach | July 3, 1917 |
| 1,297,457 | Furber | Mar. 18, 1919 |
| 1,791,887 | Davies | Feb. 10, 1931 |
| 1,795,358 | Arndt | Mar. 10, 1931 |
| 1,826,268 | Wilkins | Oct. 6, 1931 |
| 1,871,616 | Kerr | Aug. 16, 1932 |
| 2,285,025 | French | June 2, 1942 |
| 2,350,054 | McIntosh | May 30, 1944 |
| 2,373,946 | Capewell | Apr. 17, 1945 |
| 2,505,666 | Franck | Apr. 25, 1950 |
| 2,662,575 | Wolcott | Dec. 15, 1953 |
| 2,711,576 | Wilson | June 28, 1955 |
| 2,711,773 | Wilson | June 28, 1955 |
| 2,774,408 | Franck | Dec. 18, 1956 |

FOREIGN PATENTS

| | | |
|---|---|---|
| 542,803 | Great Britain | Jan. 28, 1942 |